Jan. 18, 1927.  1,615,066
O. BOERGER
HEADING DEVICE
Filed July 28, 1922

INVENTOR.
Otto Boerger
BY
Morsell & Keeney
ATTORNEYS.

Patented Jan. 18, 1927.

1,615,066

UNITED STATES PATENT OFFICE.

OTTO BOERGER, OF WITTENBERG, WISCONSIN.

HEADING DEVICE.

Application filed July 28, 1922. Serial No. 578,255.

This invention relates to a heading device for bolts and the like and particularly to a device of this character which may be conveniently employed in small factories and for home use.

The invention consists essentially of a chuck member formed in sections adapted to be supported in the jaws of a vise. A bolt holding member is supported by the chuck member and is provided with a recess in which the end of the bolt is forced by hammering or otherwise, thereby forming the bolt head.

The particular construction of the device enables the same to be employed in homes or small factories where machine shop facilities are lacking, the device furthermore being particularly adapted for heading small bars of metal.

The construction of the device forming the subject matter of this invention and the manner in using the same will be more fully hereinafter described and illustrated in the accompanying specification and drawings.

In the drawings—

Figure 1:
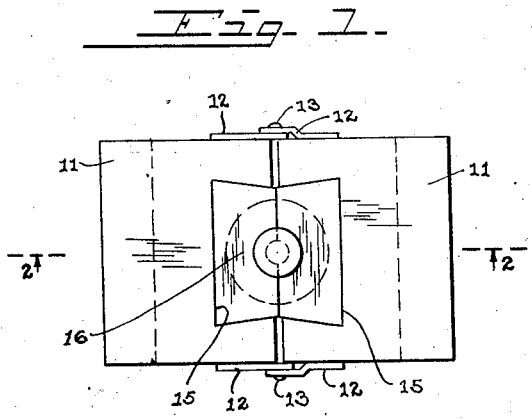
Figure 1 is a plan view of the device.
Figure 2:
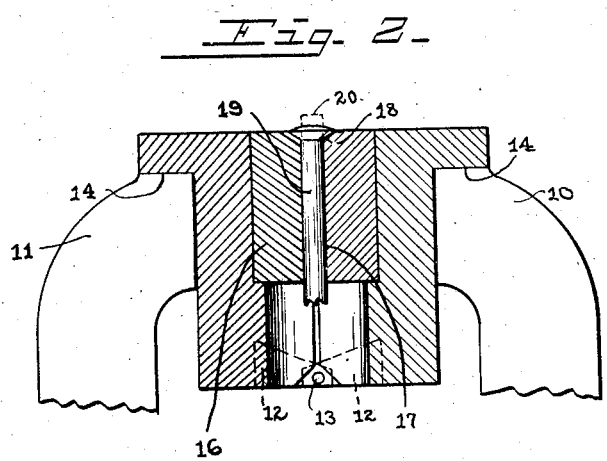
Fig. 2 is a longitudinal section, taken approximately in the plane indicated by the line 2—2 of Fig. 1, the device being shown supported by the jaws of a vise.

Referring now more particularly to the drawings wherein like reference characters indicate like parts throughout it will be noted that there is illustrated in Fig. 2 the jaws of a vise 10 between which the two halves of a chuck member 11 are adapted to be supported. The halves of the chuck member are united at their lower edge by a pair of overlapping ears or flaps 12, pivoted together as at 13. This permits the chuck member to be pulled apart for a purpose to be more fully hereinafter described.

The chuck member is shaped to provide a pair of shoulders 14 which co-operate with the jaws of the vise 10 to properly support the chuck member. The opposed faces of the chuck member halves are provided with dove-tail recesses 15 adapted to accommodate a correspondingly shaped bolt holding member 16, also formed in halves.

The opposed faces of the bolt holding member 16 are provided with recesses forming a vertically disposed opening 17 and further shaped to form a conical recess 18 at the upper end thereof. The opening 17, formed by the recesses in the opposed faces of the bolt holding member, is of sufficient size to firmly grip the bar of metal 19 which is adapted to be headed. Obviously the recesses in the bolt holding member may be of varied sizes so as to accommodate metal bars of various diameters.

In practice the chuck member is clamped in position between the jaws of the vise 10, as is clearly illustrated in Fig. 2, with the rod or bar holding member positioned within the chuck, as is clearly illustrated. By tightening the jaws of the vise, the parts are forced together so as to firmly grip the metal rod 19 which is to be headed. This metal rod is clamped in position with the end 20, as is indicated in dotted lines in Fig. 2, extending a slight distance above the upper surface of the holding member to provide sufficient metal to form the head of the bolt.

With the parts thus positioned, the projecting end of the rod 19 is pounded gently with a hammer to force the material in the conical recess 18 of the holding members 16. By so doing the rod is headed. Obviously in shaping rods of larger sizes the rod may be first heated so as to facilitate the shaping operation.

When the shaping operation has been completed the jaws of the vise 10 are separated and the chuck member sections 11 may then be separated. Because of the fact that the bolt holding member sections are dove-tailed to the chuck sections they will also be moved away from one another so as to release the headed rod 19. Obviously therefore, a plurality of bolt holding members 16 may be provided, which when together, provide openings 17 of various sizes so that rods of various diameters may be accommodated, and these various bolt holding members inserted in the chuck members as desired.

From the foregoing it will be immediately obvious that there is provided a simple and complete rod heading device which may be employed in places where machine shop facilities are lacking, and the desired result at the same time efficiently accomplished.

While one physical embodiment of the invention has been described and illustrated herein, it is not intended that this invention be unnecessarily limited but reservation is made to make such changes in the specific form illustrated as may come within the purview of the accompanying claims.

Having thus described the invention what is claimed is:

1. In a device of the class described, the combination with a chuck member formed of sections pivotally connected adjacent one end, each section being provided with a dove-tail recess of a bolt holding member also formed in sections disposed in said dove-tail recesses and arranged to be separated for the removal or insertion of a bolt upon separation of the chuck member sections.

2. In a device of the class described, the combination with the jaws of a vise of a chuck member formed in halves and adapted to be supported by said vise, means for pivotally connecting said chuck member sections adjacent their lower ends, said chuck member sections being formed with dove-tail recesses, and a rod holding member formed in sections disposed in said dove-tail recesses.

In testimony whereof, I affix my signature.

OTTO BOERGER.